350-96.18 SR
5/5/81 OR 4,265,511

United States Patent [19]
Nicia et al.

[11] 4,265,511
[45] May 5, 1981

[54] DETACHABLE CONNECTOR FOR OPTICAL FIBRES

[75] Inventors: Antonius J. A. Nicia; Cornelis J. T. Potters, both of Eindhoven, Netherlands

[73] Assignee: U.S. Philips Corporation, New York, N.Y.

[21] Appl. No.: 46,539

[22] Filed: Jun. 7, 1979

[30] Foreign Application Priority Data

Jun. 26, 1978 [NL] Netherlands .................. 7806829

[51] Int. Cl.³ .................................................. G02B 5/14
[52] U.S. Cl. ............................ 350/96.18; 350/96.20; 350/96.21
[58] Field of Search ............... 350/96.18, 96.20, 96.21, 350/175 SL

[56] References Cited
U.S. PATENT DOCUMENTS

| 3,902,784 | 9/1975 | Dakss et al. ........................ 350/96.20 |
| 3,950,075 | 4/1976 | Cook et al. ........................ 350/96.18 |
| 3,954,338 | 5/1976 | Hennel et al. ...................... 350/96.21 |
| 4,082,421 | 4/1978 | Auracher et al. .................. 350/96.18 |
| 4,118,100 | 10/1978 | Goell et al. ...................... 300/96.20 |
| 4,186,998 | 2/1980 | Holzman .......................... 350/96.21 |

*Primary Examiner*—Stewart J. Levy
*Attorney, Agent, or Firm*—Marc D. Schechter

[57] ABSTRACT

A detachable connector, for coupling the ends of optical fibers, comprising two connector portions, each connector portion having fixing means, for detachably connecting the connector portions to each other, and at least one rotationally symmetrical housing having a bore which is coaxial to a central axis. The housing has a reference face at one end and adjusting means secured in the bore at an opposite end. The adjusting means enables an optical axis, of an end of an optical fiber to be secured in a tube, and to be adjusted parallel to the central axis of the housing. When the two interconnected connector portions contact each other by way of the reference faces, the optical axes of the fibers in each connector portion are parallel to one another.

4 Claims, 3 Drawing Figures

U.S. Patent        May 5, 1981        4,265,511
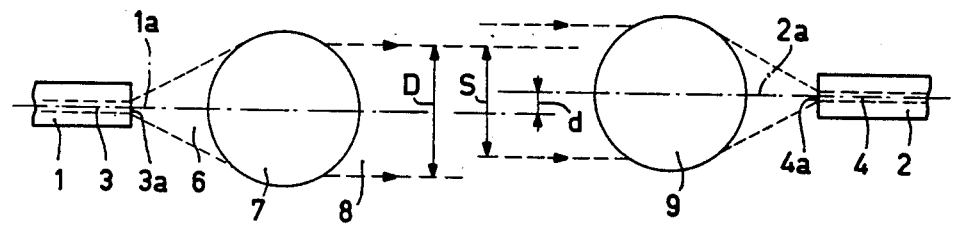
FIG.1
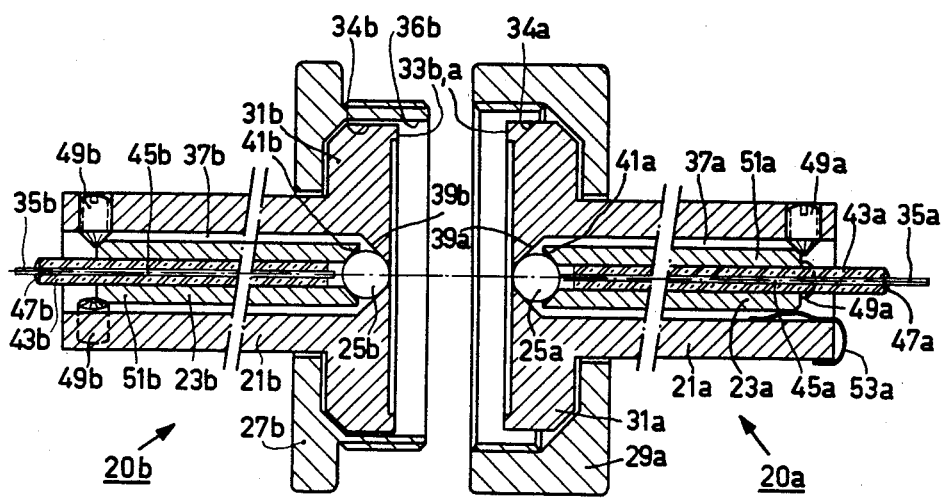
FIG.2    20
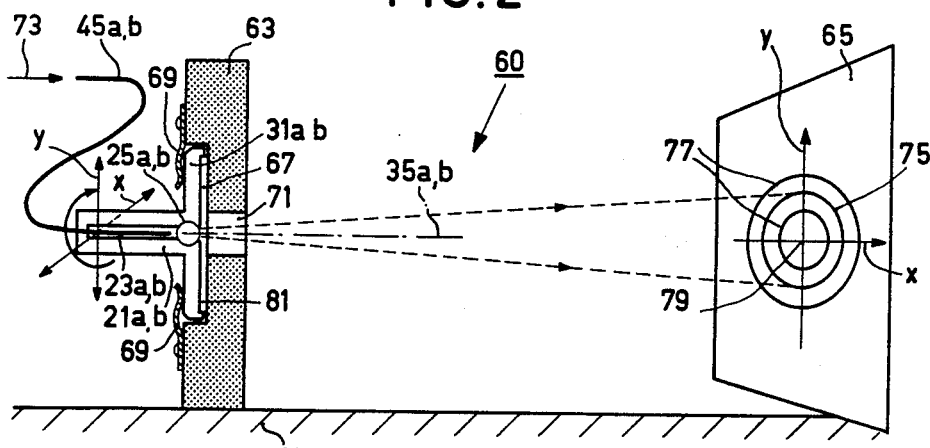
FIG.3

DETACHABLE CONNECTOR FOR OPTICAL FIBRES

BACKGROUND OF THE INVENTION

The invention relates to a detachable connector for coupling the ends of optical fibers.

Connectors of the kind which can be quickly detached are used in optical communication systems in which data is transmitted, via optical fibers, from one location to another in the form of light pulses. For data transmission, the attenuation of the signal to be transmitted, in this case light pulses, should be minimized.

One of the causes of signal attenuation occurring in an optical communication system is formed by the connectors required for coupling the optical fibers used. Therefore, any signal attenuation caused by the connectors should be minimized.

Because the optical fibers to be coupled have effective diameters of 100 μm and smaller (which are the diameters of the light conductive cores of the fibers), many components of the connectors to be used are made with a very high precision as described in U.S. Pat. No. 3,902,784. This makes the connectors expensive and vulnerable, which is of course a disadvantage. On the other hand, the signal attenuation caused by said connectors can be small. However, for practical reasons optical communication systems require connectors which are easy to handle and which are not too expensive.

SUMMARY OF THE INVENTION

One object of the present invention is to provide a connector which is easy to handle and which requires only standard manufacturing precision so that it is not expensive.

According to the present invention a detachable connector for coupling the ends of optical fibers comprises two connector portions. Each connector portion comprises fixing means, for detachably connecting the connector portions to each other, and at least one rotatable symmetrical housing, a rotationally symmetrical tube, and a ball lens. The housing is provided with a bore, which is coaxial to a central axis of the housing, and with a reference face perpendicular to the central axis on one end. A seat is formed in the bore at the end near the reference face. The seat faces the end of the housing which is remote from the reference face and accommodates the ball lens which is retained there by the tube. The tube bears against the lens by way of a seat formed thereon. At an end which is remote from the seat, the tube is supported by adjusting means secured in the housing. The adjusting means enable an optical axis, of an end of an optical fiber to be accommodated in the tube to be adjusted at least parallel to the central axis of the housing.

The connector comprises adjusting means whereby the optical axis of the fiber can be adjusted to remain parallel to the central axis. This offers the advantage that when two housings are coupled by way of their reference faces, the optical axes of the fibers extend at least parallel to each other. The coupling losses are then reduced by the use of ball lenses, because the light beam emerging from a ball lens is substantially nondivergent, with the result that the light emerging from the end face of the one fiber is focussed substantially completely onto the end face of the other fiber, except for any loss which occurs due to some unavoidable divergence and due to any quantity of light which falls outside the lens due to the unavoidable distance between the central axes of the housings. The losses which occur due to reflections from lens surfaces and the like can be restricted in known manner by the use of antireflective coatings and by using, for example, a coupling liquid which is to be introduced between the lens and the fiber and which has a refractive index adapted to the refractive index of the lens and the core of the optical fiber.

Furthermore, the end faces of the fibers are located inside the housing, with the result that the risks of damaging or contaminating the end faces are eliminated. Damage to or slight contamination of the lens surface is less critical in view of the size of the lens surface area with respect to the surface areas of the end faces of the fibers. Furthermore, each lens is situated completely inside the housing, so that the risk of damage is substantially nil.

In one embodiment the housing is shaped as a tube on which a flange is formed. The side of the flange which is remote from the housing is provided with an abutment edge which forms the reference face.

BRIEF DESCRIPTION OF THE DRAWINGS

An example of the connector will now be described in more detail with reference to the accompanying drawing.

FIG. 1 shows a principle used in the connector.

FIG. 2 is a sectional view of embodiments of connector portions of a connector according to the invention.

FIG. 3 shows a device for aligning an end of a fiber, with respect to a central axis of a connector portion of a connector according to the invention.

DESCRIPTION OF THE PREFERRED EMBODIMENTS

FIG. 1 shows two ends 1, 2 of optical fibers. The optical axes 1a and 2a are assumed to be parallel and are offset a distance d from each other. This distance may be on the order of magnitude of the diameter of the optical cores 3, 4 (100 μm) of the optical fibers 1, 2. If the fibers 1 and 2 were directly coupled to each other, the end faces 3a and 4a then being arranged opposite one another while maintaining such an offset distance, the transmission of light from the light conductive core 3 to the core 4, or vice versa, (the coupling efficiency) would be (substantially) nil. Referring again to FIG. 1, the light beam 6 emitted by the fiber core 3 is refracted by a ball lens 7 to form a substantially parallel light beam 8 having a diameter D. A parallel beam is produced because the focal point of the lens 7 is situated at the end face 3a. Similarly, the focal point of the ball lens 9 is situated at the end face 4a. The diameter D exceeds the diameter of the light conductive core 3 by a factor 20 to 100. A part S of the beam 8 formed by means of the lens 7 is then projected, via the lens 9, onto the light-conductive core 4. It will be clear that as a result of the use of such an arrangement of the lenses 7 and 9 and the end faces 3a and 4a, a better coupling efficiency can be achieved in comparison with a direct coupling between the fiber ends 1 and 2. However, this increased efficiency can only be realized if the optical axes 1a and 2a are be parallel. If the optical axes 1a and 2a are parallel and coincide, the coupling efficiency is optimum.

The connector 20 shown in FIG. 2 comprises two connector portions 20a and 20b which are substantially identical. Each connector portion 20a, 20b comprises a rotatable symmetrical housing 21a, 21b, a rotationally symmetrical tube 23a, 23b and a ball lens 25a, 25b. The connector portions 20a and 20b can be detachably connected to each other by means of an adaptor 27b and a nut 29a, the housings 21a and 21b then contacting each other by way of the abutment edges 33a and 33b formed on flanges 31a and 31b. The abutment edges 33a, 33b are directed perpendicular to of the central axis 35a, 35b of the housings 21a, 21b, respectively and form a reference face. The outer wall 34a, 34b of the flanges 31a, 31b are adapted to the diameter of the inner wall 36b of the adapter 27b with a precision which can be achieved on a normal lathe, with the result that the central axes 35a, 35b are at least parallel to each other and are situated at most a short distance from each other.

Each housing 21a, 21b, comprises a bore 37a, 37b which is coaxial with the central axis 35a, 35b. Each housing also comprises a seat 39a, 39b, at the flange 31a, 31b side of bore 37a, 37b. The lens 25a, 25b is pressed against the seat 39a, 39b by way of a tube 23a, 23b. The tube is provided with a seat 41a, 41b for this purpose. A bore in the tube 23a, 23b accommodates a capillary 43a, 43b in which an optical fiber 45a, 45b, is secured. Alternatively, the fiber could be directly secured in a narrower bore in the tube 23a or 23b. The fibre 45a, 45b is secured by means of an epoxy resin 47a, 47b.

As has already been described with reference to FIG. 1, the ends of the optical fibers 45a, 45b should be adjusted to be parallel to the central axis 35a, 35b. The housing 21b is provided with three adjusting screws 49b (only two screws are shown in the figure) for this purpose. The screws locate and position the tube 23b in the bore 37b. The end 51b of the tube 23b can be displaced in two directions, transverse to the central axis 35b and transverse to each other, by adjusting of the three adjusting screws 49b. The ball lens 25b serves as a bearing for pivoting the tube 23b as the end 51b is displaced.

In the connector portion 20a, the end 51a of the tube 23a can be independently adjusted in two directions, transverse to the central axis 35a and transverse to each other. In each of the two directions indicated, the tube 23a is located between an adjusting screw 49a and a leaf spring 53a which presses the tube 23a agnanst the adjusting screw 49a. As a result, the desired position of the tube 23a can be obtained by only two adjusting operations.

The adjusting screws 49a, 49b and the tubes 23a, 23b comprise bevelled edges on their contacting faces so as to press tubes 23a, 23b against ball lenses 25a, 25b.

FIG. 3 shows a device 60 whereby a connector portion 20a, 20b of a connector 20 as shown in FIG. 2. The adjustment involves
a. adjustment of the correct distance between the lens and the end face of a fiber end, and
b. alignment of the tube with respect to the central axis of the connector portion.

The device 60 comprises a base plate 61 on which there are arranged a holder 63 as well as a screen 65 at a distance therefrom. The holder 63 comprises a recess 67 in which the flange 31a, 31b of the housing 21a, 21b fits. The housing 21a, 21b is retained in the holder 63 by clamping springs 69. The holder 63 further comprises a hole 71 which opens into the recess 67. Light radiated into the optical fiber 45a, 45b (denoted by an arrow 73) is projected onto the screen via the ball lens 25a, 25b. In the capillary 43a, 43b (see FIG. 2), the fiber 45a, 45b is slid toward the lens 25a, 25b until the focal point of the lens 25a, 25b is situated at least substantially at the end face of the fiber 45a, 45b; this can be observed on the basis of the image 75 of the light via the lens 25a, 25b on the screen 65. Subsequently, the fiber 45a, 45b is glued in the capillary 43a, 43b.

After the fiber 45a, 45b has been secured, the end 51a, 51b of the tube 23a, 23b is displaced in the x-direction and the y-direction, so that the image 75 can be symmetrically situated in a target 77 drawn on the screen 65. The center 79 of the target 77 is situated in the prolongation of a central axis 35a, 35b of the housing 21a, 21b to be positioned in the recess 67. The end of the fiber 45a, 45b extends parallel to the central axis 35a, 35b if no displacement of the image 75 occurs when the housing 21a, 21b is rotated about the central axis 35a, 35b in the recess 67.

Due to dimensional tolerances of the diameter of the flange 31a, 31b, the central axis 35a, 35b of the housing 21a, 21b will not always be directed onto the center 79 of the target 77. In order to enable exact adjustment to be realized, the recess is preferably V-shaped at the lower side 81, so that the central axis 35a, 35b can occupy different positions only in the y-direction. The screen 65 or the holder 63 can be displaced in the y-direction, so that the central axis 35a, 35b can be directed onto the center 79 by a few simple operations. However, it has been found that the manufacture of the housings 21a, 21b with standard precesion offers a flange 31a, 31b with a diameter which is sufficiently accurate to make readjustment of the screen 65 or the holder 63 with respect to each other superfluous.

What is claimed is:

1. A detachable connector, for coupling the ends of optical fibers, comprising two connector portions, each connector portion comprising:
   a housing, rotationally symmetrical about a central axis, said housing having a first end and a second end and a bore, which is coaxial to the central axis, extending from the first end to the second end, said housing further comprising a reference face at the first end, said reference face being perpendicular to the central axis, and a seat in the bore at the first end of the housing, said seat facing the second end of the housing;
   a tube, rotationally symmetrical about an axis of the tube, said tube having a first end and a second end and a seat, said seat being at the first end and facing away from the second end, said tube having a bore in which an end of a fiber to be coupled is secured, said tube being secured in the bore of the housing with the seat of the bush facing the seat of the housing at the first end of the housing and with the second end of the bush at the second end of the housing;
   a ball lens, said ball lens being accommodated in the bore of the housing between the seat of the housing and the seat of the tube and forming a bearing between the tube and the housing;
   means for adjusting the position of the second end of the tube radially with respect to the central axis of the housing, said adjusting means enabling an optical axis of the fiber secured in the tube to be adjusted at least parallel to the central axis of the housing by pivoting the second end of the tube about the ball lens; and
   means for detachably connecting the connector portions to each other with their reference faces in contact.

2. A connector as claimed in claim 1, wherein the housing has a tubular shape with a flange at the first end, and wherein the reference face comprises an abutment edge on a side of the flange facing away from the second end of the housing.

3. A connector portion, for coupling an end of an optical fiber to an end of another optical fiber or to a light emitter or receiver, comprising:

- a housing, rotationally symmetrical about a central axis, said housing having a first end and a second end and a bore, which is coaxial to the central axis, extending from the first end to the second end, said housing further comprising a reference face at the first end, said reference face being perpendicular to the central axis, and a seat in the bore at the first end of the housing, said seat facing the second end of the housing;
- a tube, rotationally symmetrical about an axis of the tube, said tube having a first end and a second end and a seat, said seat being at the first end and facing away from the second end, said tube having a bore in which an end of a fiber to be coupled is secured, said tube being secured in the bore of the housing with the seat of the tube facing the seat of the housing at the first end of the housing and with the second end of the tube at the second end of the housing;
- a ball lens, said ball lens being accommodated in the bore of the housing between the seat of the housing and the seat of the tube and forming a bearing between the tube and the housing; and
- means for adjusting the position of the second end of the tube radially with respect to the central axis of the housing, said adjusting means enabling an optical axis of the fiber secured in the tube to be adjusted at least parallel to the central axis of the housing by pivoting the second end of the tube about the ball lens.

4. A connector portion as claimed in claim 3, wherein the housing has a tubular shape with a flange at the first end, and wherein the reference face comprises an abutment edge on a side of the flange facing away from the second end of the housing.

* * * * *